March 30, 1926.
1,578,591
E. D. FEAR
ART OF MAKING ICE CREAM
Filed March 29, 1921
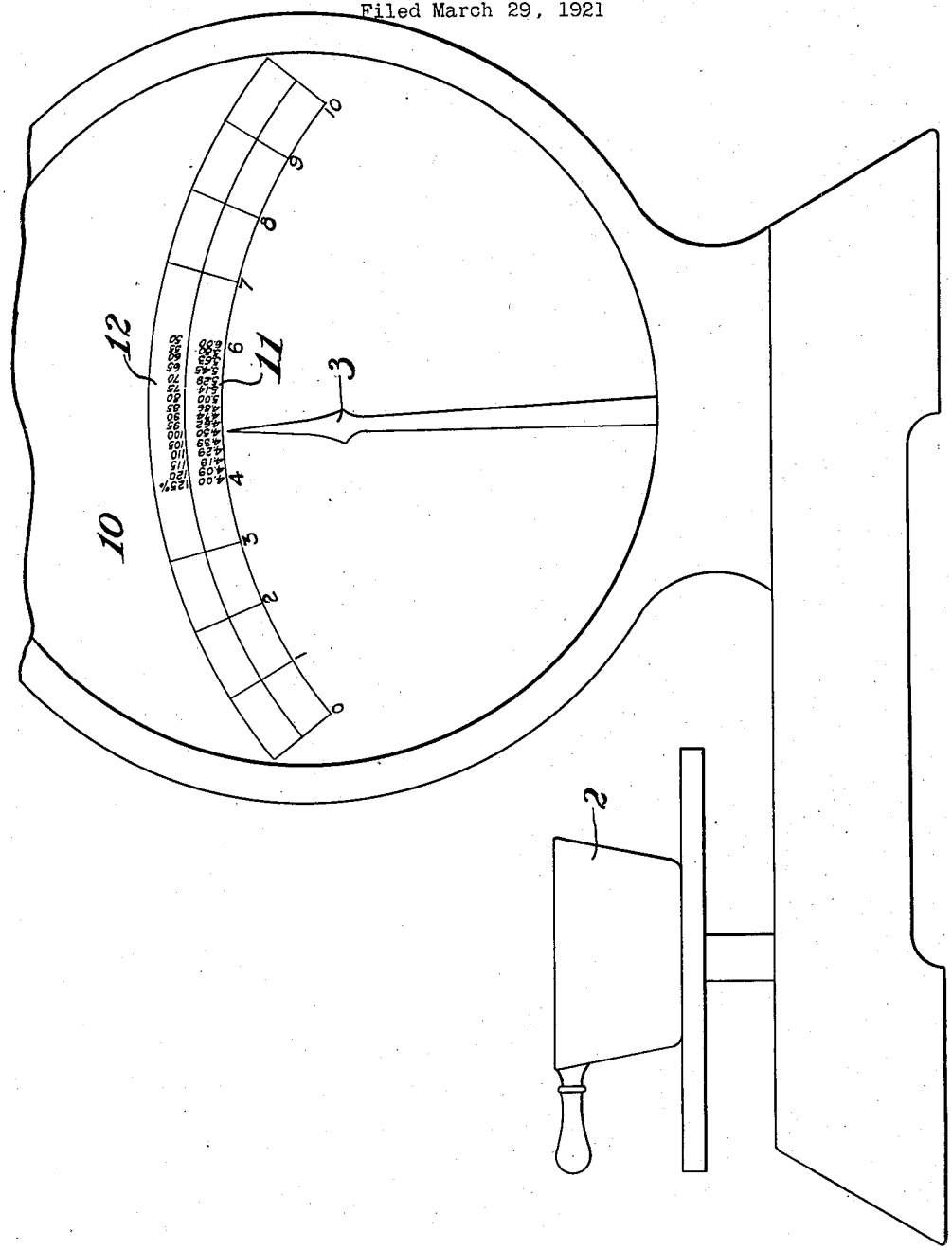
INVENTOR
*Ernest D. Fear*
BY
*N.L. & C.L. Reynolds*
ATTORNEYS Patented Mar. 30, 1926.

1,578,591

UNITED STATES PATENT OFFICE.

ERNEST D. FEAR, OF SEATTLE, WASHINGTON.

ART OF MAKING ICE CREAM.

Application filed March 29, 1921. Serial No. 456,776.

*To all whom it may concern:*

Be it known that I, ERNEST D. FEAR, a citizen of the United States of America, and resident of the city of Seattle, in the county of King and State of Washington, have invented certain new and useful Improvements in the Art of Making Ice Cream, of which the following is a specification.

My invention relates to a method whereby the amount of ice cream mix necessary to produce finished ice cream of a given overrun and weight per unit volume of the finished product may be determined with accuracy, and to apparatus for carrying out such a method.

The primary object of my invention is to provide a method whereby the ice cream made up for the same mix at different times, or made up from different batches, may always be a uniform product, both in overrun and in weight of solid contents per unit volume.

In accomplishing the primary object I accomplish also another object, which is the saving to the ice cream manufacturer of food values which, under the usual hit-or-miss system now in general use, are ordinarily wasted. Occasionally, however, these food values, in the expansion of the ice cream during the process of manufacture, are so spread through the finished ice cream that it falls below the legal or proper standard of food value per unit volume. It is an object of my invention to eliminate the possibility of such occurrences.

It is also my object to provide a method and apparatus whereby the manufacturer may, during the process of manufacture, determine quickly, easily, and accurately the stage to which the mix has progressed.

My invention will be hereinafter fully described, and those steps and the apparatus which I claim to be novel and upon which I desire the protection of Letters Patent will be particularly defined in the appended claims.

In the drawing I have shown a scale and a cup of a given volume which are illustrative of the apparatus I may employ.

From experience gained by making service visits to different ice cream plants scattered through twelve of the Western and Middle Western States, a variation in weight of mix was found to run from 8.50 pounds to 9.50 pounds per gallon, the same over-run or swell by volume being maintained, regardless of the weights of mix per unit volume in every case. The finished ice cream would vary not only in weight per gallon, but in butter fat, serum solids, and sugar. The manufacturers of ice cream machinery and equipment have not heretofore perfected methods or equipment to regulate this error in ice cream manufacture and attention is paid only to the swell or overrun in volume, not in weight.

It will assist in making clear my invention to review briefly the present methods of ice cream manufacture. The mix, which is converted into ice cream by whipping and freezing, is composed of butter fat, sugar, and serum solids or proteins, and water. Although no standard has been generally set, the ideal mix contains 10% each by weight of the above solids. If the percentage of butter fat is excessive the consumer's system is so heated that the cooling effect of the ice cream is neutralized. If the percentage of serum solids is low, the food value of the ice cream is low, and if the percentage thereof is high, the manufacturer is supplying more than his customer is entitled to receive, and is losing the excess food value which might be saved by standardization. Variations in the weight per unit volume occur by reason of the addition of flavoring matter, fruits, and such materials, and because of imperfect mixing of solids with the milk. The first batch drawn from a mix is often lighter than subsequent batches, because the solids were not equally distributed throughout the mix.

It is the present practice to supply additional serum solids in the form of skim milk powder to the milk to be frozen, and to add butter fat in the form of cream. Sugar is also added, and the resultant mixture is measured out by volume. Five gallons are commonly taken, which are intended to produce approximately ten gallons of ice cream. The overrun, or swell, which is the percentage increase in volume of the ice cream over the volume of the mix, is thus about 100%.

To determine whether the mix has attained the proper overrun, the only available method has been to take a given volume of the actual mix being used at the start, and, using its weight as a unit, to continue to weigh equal volumes from time to time, comparing their weights with the unit first taken. Whenever the weight of the given volume of mix, after whipping, has reached one-half of the weight of the same volume at the start, it was evident that 100% overrun has been reached. Different overruns, ranging for instance from 50% to 125% in the commercial product, might be obtained in the same way. Another method was to use five gallons of mix, and when the operator judged that it was finished, to draw it from the freezer.

The first of these methods is apparently fairly accurate, but the fallacy of both methods lies in taking the volume or the weight per unit volume of an actual mix as a starting point, or as a unit. This arbitrarily sets a unit for each separate batch, without taking into account the variations of the different units. The different batches are not reduced to terms of a common or a standard batch.

The weight of the solids in the mix determines its weight per unit volume. It is inevitable, in commercial processes, that the contents of such mixes will vary. Occasionally there will be too little solid content in the mix, but more often there is too much. The manufacturer is thus supplying more than is necessary, and often there is so much of the butter fat, for instance, per unit volume of the finished ice cream, that a product results that is inferior in all ways to one having less butter fat content per unit volume.

Thus, while the overrun on a heavy mix may be 100% of its volume, if this is reduced to terms of the ideal mix, it may be found to be only 85% overrun on the ideal mix, figured by weight, although the volume of the actual finished product is the same as the volume produced by 100% overrun of the ideal mix. An example may make this clear. If a mix weighing 8.75 pounds per gallon is selected as a standard, at 100% overrun by volume, a gallon would weigh 4.38 pounds. Suppose the actual mix weighs 9.25 pounds per gallon; at 100% overrun a gallon would weigh 4.62 pounds. The volume of the finished products would be exactly the same, but the latter would be much the richer and heavier of the two. The manufacturer thus loses 0.5 pounds of solids in each gallon of mix, this being equivalent to 0.5 gallons of mix in the five gallons used. He is adding approximately 6% more solids then is necessary, and his ice cream would be better for its elimination. In measuring by volume, however, this is not detected.

By my invention the overrun attained is not taken as a percentage of the volume or even of the weight of the actual mix. By selecting an ideal mix, having a given weight per unit volume, and by reducing the actual mix to terms of this ideal mix by comparing weights per unit volume of the two, the overrun of the actual mix may be any percentage of its original volume, but it can be regulated to be exactly 100% of the ideal mix, or any other desired percentage. The volume of the actual mix bears the same relation to the volume of the ideal mix as the actual weight per unit volume of the solid contents of the mix bears to the ideal weight per unit volume of the ideal mix.

The selection of the ideal or standard mix is important in this connection. I have found that a mix of the proportion by weight given above, namely, 10% butter fat, 10% sugar, and 10% serum solids, and the rest principally water, serves excellently as an ideal mix. This is in general the proportion approximated by most ice cream manufacturers. The weight of such a mix, per gallon, is 9.0 pounds. Five gallons, therefore, will weigh 45 pounds. This will be the weight of the amount of mix taken, and consequently the weight of the ice cream. If it is the intention of the manufacturer to have 100% overrun in his finished product, this will then weigh 4.5 pounds per gallon. Such an overrun on this mix produces a standard ice cream, with a proper amount of butter fat and sufficient food value in the form of serum solids. In this manner the ideal mix is selected, although it is entirely possible to use a mix of another weight, for instance one weighing 8.50 pounds per gallon, or 9.25 pounds per gallon.

It can be readily seen that if five gallons of a mix of 8.50 pounds to the gallon were employed, and this were given 100% overrun, the resulting ice cream would be deficient in food value, as compared to the ideal, because it would weigh but 4.25 pounds per gallon. Such a mix, therefore, to bring it to the standard of 4.5 pounds per gallon of finished ice cream should not reach 100% overrun, but should be drawn when it reaches 95.5% overrun.

This, however, does not produce the desired 10 gallons of ice cream, if 5 gallons of the mix were used. In order to produce 10 gallons of the finished product I employ an additional 0.294 gallons of the mix, this being the amount which weighs 2.5 pounds, or enough to bring the total weight of the mix employed to 45 pounds. When this amount of mix is given the equivalent of 100% overrun of a 9 pounds to the gallon mix (in reality an actual 94.5% overrun) it is then ice cream of the standard weight of 4.5 pounds per gallon.

The same process may be carried out when the mix, as is usually the case, is overweight. Let us suppose it weighs 9.50 pounds per gallon. If this were given only 100% overrun, the resulting ice cream would be too heavy, as compared to the ideal, because a gallon of it would weight 4.75 pounds, where it should only weigh 4.5 pounds. The excess weight is due to added and unnecessary solids in the mix. To bring such a mix to the standard of 4.5 pounds per gallon, it should be brought to 105.6% overrun, or enough to spread the solids out so that they cause the ice cream to weigh 4.5 pounds per gallon.

This produces more than ten gallons of ice cream, if five gallons of this mix were used. Enough mix must be subtracted from the five gallons to have the whole weigh 45 pounds, instead of 47.5 pounds. This 2.5 pounds represents 0.263 gallons. When the remaining 4.737 gallons is given the equivalent of 100% overrun of the ideal mix (actually 105.6% overrun) it is then the standard ice cream.

It can be seen from these illustrations that three steps are necessary to successfully carry out this process. First, an ideal mix must be selected. Second, the actual mix must be reduced to terms of the ideal mix in weight per gallon, although the actual measurement may be by volume. Third, the mix is carried through the freezing process until it reaches the equivalent of 100% overrun of the ideal mix.

This process may be conveniently carried out by the apparatus illustrated and in the following manner. On one side the dial 10 of the scale is marked in pounds, while on the other side it is marked in percentages of overrun. A half pint is one-sixteenth of a gallon, and an ounce being one-sixteenth of a pound, by calibrating the scale actually in ounces and by measuring half-pints instead of gallons, the reading will exactly correspond to the weight of a gallon in pounds, and will be less confusing to the operator. Thus a half-pint of ideal mix, contained in the measuring cup 2, weighs 9 ounces to start, and a gallon will weigh 9 pounds. This is zero percent overrun. As the whipping progresses the half pint of mix grows lighter, until at 100% overrun it weighs 4.5 ounces. By weighing the cup full of the mix from time to time, the percentage of overrun can be read directly upon the figures 12. When 100% overrun is reached the whipping process is stopped.

If the cup full of mix at the start weighs 8.5 or 9.5 ounces according to the figures 11, it can be seen that the mix is under or overweight, as the case may be, and the necessary correction is made as was stated above, adding to or subtracting from the volume, and consequently the weight of the total contents of the freezer. The whipping now progresses until the cup full of mix weighs 4.5 ounces; that is, until the pointer 3 indicates 100% overrun. These are figures in terms of the ideal mix, and do not represent the actual overrun of the mix being whipped, but it is apparent that when the half-pint of mix weighs 4.5 ounces, the whole batch of mix is of the ideal weight per gallon.

This will be true no matter what percentage of overrun is desired, inasmuch as all figures in the column 12 are in terms of the ideal mix. If only 90% overrun is desired, this point will be reached when the half pint cup 2 full weighs 4.74 ounces. It will be true, too, no matter what the half pint of mix originally weighed.

By this process absolutely uniform ice cream is obtainable, no matter how greatly the mix may vary. The manufacturer saves himself the extra solids so often put into the mix, without reducing the quality of his product. In reality, his product is often benefited, and made less rich and heavy, by cutting down on the solids. It is easy to determine at all times to what point the whipping has progressed. Further, it furnishes a basis, aside from the butter fat content, for standardizing ice cream, legally or by custom.

What I claim as my invention is:

1. In the art of making ice cream, the method of standardization thereof which consists in giving each of several actual mixes of random weights per unit volume an overrun, and in stopping the overrun when the weight per unit volume of each actual mix equals the weight per unit volume of a selected standard mix at a selected standard overrun.

2. In the art of making ice cream, the method of standardization thereof which consists in determining the weight per unit volume of each of several actual mixes, taking sufficient mass of each to equal the mass of a predetermined volume of a standard mix, and in giving each such mass of actual mix an overrun such that its weight per unit volume will equal the weight per unit volume of the standard mix at the selected overrun of the standard mix.

3. In the art of making ice cream, the method of standardization thereof which consists in weighing a unit volume of an actual mix, taking sufficient volume thereof that its weight will equal the weight of a predetermined volume of a standard mix, and in giving such sufficient volume an overrun such that its weight per unit volume will equal the weight per unit volume of the standard mix at the selected overrun of the standard mix.

4. In the art of making ice cream, the method of standardization thereof which consists in drawing off a given volume of an actual mix, in weighing a unit volume thereof, in adding to or subtracting from the total volume of actual mix enough thereof to cause it to equal the weight of a volume of a mix of standard weight per unit volume equal to the volume of actual mix first drawn off, and in giving the resultant volume of actual mix an overrun such that its weight per unit volume equals the weight per unit volume of the standard mix at the selected percentage of overrun.

Signed at Seattle, King County, Washington this 23rd day of March 1921.

ERNEST D. FEAR.